Oct. 7, 1969 H. C. WENDT 3,470,751
GYROSCOPE HAVING MEANS FOR PREVENTING GIMBAL LOCK ERRORS
Filed Dec. 12, 1966 4 Sheets-Sheet 1

INVENTOR
HARRY C. WENDT

BY Richard E. Hosley

ATTORNEY

Oct. 7, 1969  H. C. WENDT  3,470,751
GYROSCOPE HAVING MEANS FOR PREVENTING GIMBAL LOCK ERRORS
Filed Dec. 12, 1966  4 Sheets-Sheet 2

INVENTOR
HARRY C. WENDT

BY *Richard E. Horley*

ATTORNEY

Oct. 7, 1969          H. C. WENDT          3,470,751
GYROSCOPE HAVING MEANS FOR PREVENTING GIMBAL LOCK ERRORS
Filed Dec. 12, 1966          4 Sheets-Sheet 3
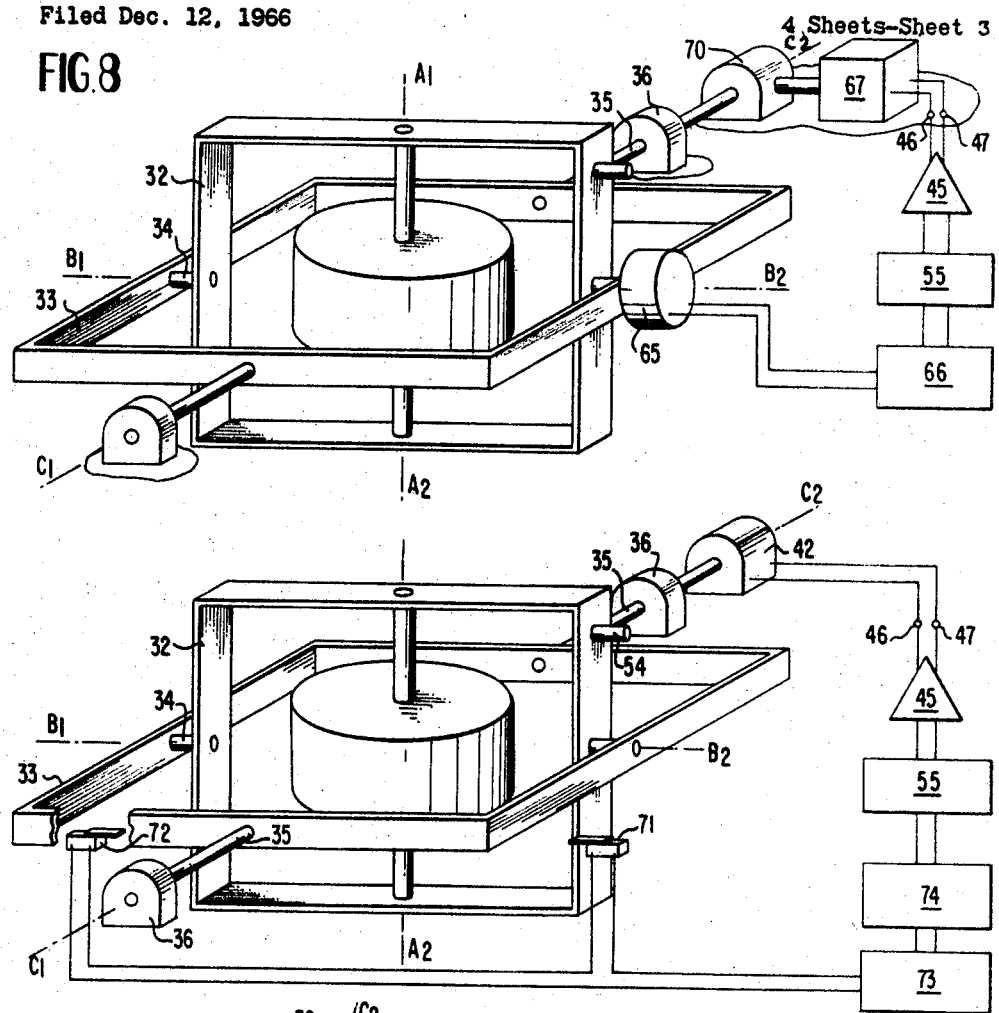
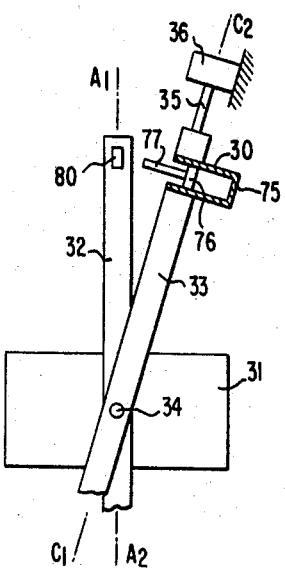
INVENTOR
HARRY C. WENDT
BY *Richard E. Hurley*
ATTORNEY Oct. 7, 1969  H. C. WENDT  3,470,751
GYROSCOPE HAVING MEANS FOR PREVENTING GIMBAL LOCK ERRORS
Filed Dec. 12, 1966  4 Sheets-Sheet 4
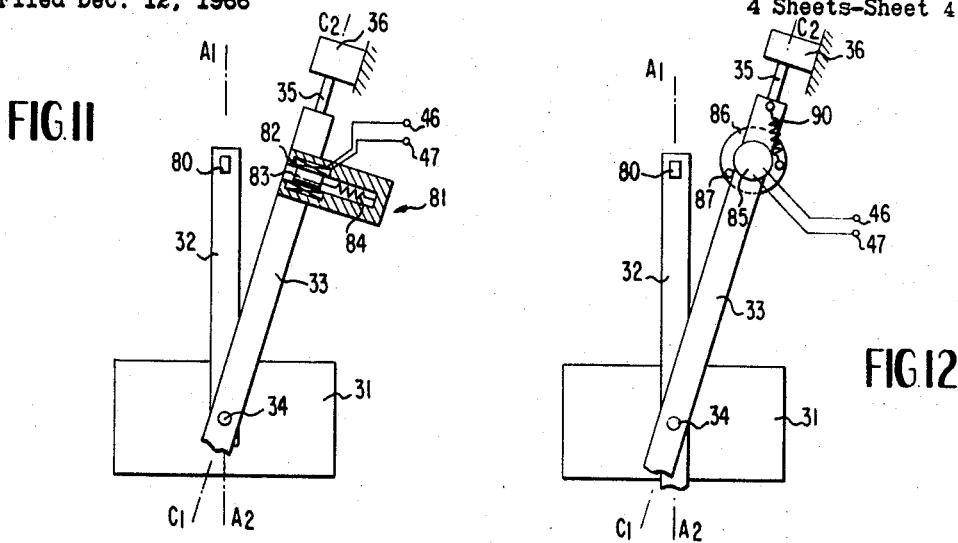
FIG.11
FIG.12
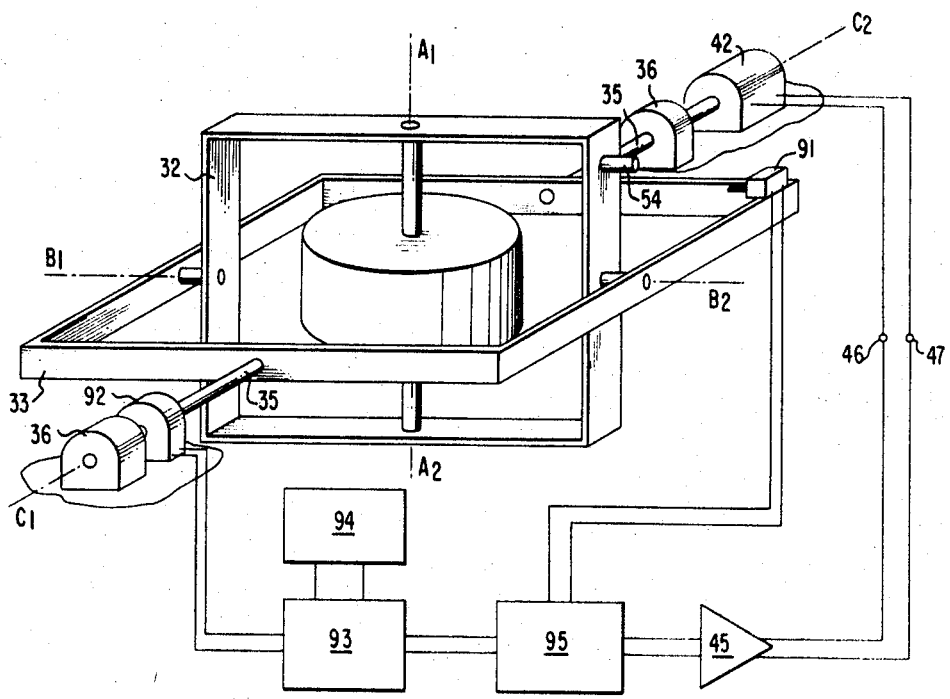
FIG.13
INVENTOR
HARRY C. WENDT
BY  *Richard E Hosley*
ATTORNEY United States Patent Office 3,470,751
Patented Oct. 7, 1969

3,470,751
GYROSCOPE HAVING MEANS FOR PREVENTING GIMBAL LOCK ERRORS
Harry C. Wendt, Lynnfield, Mass., assignor to General Electric Company, a corporation of New York
Filed Dec. 12, 1966, Ser. No. 600,902
Int. Cl. G01c 19/04
U.S. Cl. 74—5.2                    10 Claims

ABSTRACT OF THE DISCLOSURE

A gyroscope having improved gimbal lock prevention. The gyroscope senses the rate at which the gimbal lock position is being approached, stops the gimbals from achieving the gimbal lock position through the use of an adjustable stop and then applies a precessional torque to the gyroscope to cause the outer gimbal to rotate 180°

---

The present invention relates to gyroscopes and more particularly to gyroscopic instruments which indicate direction or attitude in flight and have means for preventing gimbal lock errors.

Gyroscopic instruments used, especially in air vehicles, to indicate angular rotation about three principal control axes are usually referred to as directional gyroscopes or vertical gyroscopes, directional gyroscopes normally being used to indicate azimuth while vertical gyroscopes indicate pitch and roll. Most gyroscopic instruments were initially limited in their range of operation and had to be caged if the vehicle in which they were mounted was maneuvered so as to exceed the gyroscope limits. However, the demand developed for indicating gyroscopes which allowed complete maneuvering of the vehicle without caging the gyroscopes. In order to provide such instruments, the gyroscope was made completely universal, i.e., the gyroscope was made to be completely free to rotate in its gimbal support. Such universal gyros were found to have two distinct disavantages, however. The first difficulty arose when the vehicle was maneuvered to a so-called gimbal lock position in which the gyro spin axis became aligned with the major gimbal axis. In the gimbal lock position a large error in indication could occur, particularly if a turn were made about the aligned gimbal and spin axes, since gyroscopes have no rigidity with reference to angular rotation about their spin axes. The second difficulty encountered occurred because it was possible to maneuver about the gyro gimbal axes so that the attitude of the vehicle carrying the gyro was changed 180° without any corresponding change in the gyro indication. Such reverse indications were confusing and tended to discourage complete reliance upon the instrument. Subsequently, the gyroscopic instrument which was not caged, but which was not completely universal was developed. Such a gyroscope is completely described and claimed in the patent of Allen T. Sinks, Patent No. 2,730,813, issued Jan. 17, 1956 and assigned to the same assignee as the present invention. A fixed stop means between the gyroscope and its supporting gimbal prevented the gyroscope from quite reaching the gimbal lock position. When the stop means was engaged during a maneuver tending to swing the gyroscope to or through the gimbal lock position, torques were developed which quickly swung the outer gimbal around end-for-end whereupon the gyroscope was free to proceed with its rotation relative to the outer gimbal without further interference from the stop means. This rotation of the outer gimbal occurred when the axis of gimbal rotation and the spin axis of the gyroscope were every near alignment, so that only a small error arose in the displacement of the gyroscope's spin axis during outer gimbal rotation. Furthermore, rotation of the outer gimbal caused a corresponding rotation of the gyroscope indicator so that the correct sense of indication was maintained. However, as recognized above, small errors did arise in the spin axis orientation, and in today's high-performance vehicles it is very desirable if not of the utmost necessity to minimize or eliminate these errors when measurements about the gyro minor axis are being taken.

It is an object of this invention to provide a new and improved gyroscope indicating instrument which is particularly adapted for use on high-performance vehicles.

Another object of the present invention is to provide a gyroscopic instrument which permits universal maneuvering of a vehicle without caging the gyroscope, but which does not have the above-mentioned disadvantages of a universal gyroscope or of a gyroscope utilizing a fixed stop means.

Still another object of this invention is to provide a gyroscopic instrument which will not give reverse readings and in which errors in spin axis orientation are substantially reduced.

In essence, this invention provides means for preventing a gyroscope from going through the gimbal lock position by causing the outer gimbal to rotate about the major axis approximately 180° and the inner gimbal to rotate about the minor axis to restore the spin axis to its original orientation and thereby compensate for any errors introduced as a result of the rotation of the outer gimbal. More specifically, a resultant torque to cause such rotation of the outer gimbal without a resultant error in the spin axis orientation is obtained by sensing the rate at which the major and spin axes come into alignment, the gimbal closure rate or looping rate, and then in response thereto either varying a stop position just before the gimbal lock position or causing interference between the inner and outer gimbals at a fixed angle before the gimbal lock position and applying a torque about the major axis of a value and direction to cause the spin axis to return to its original orientation.

This invention is pointed out with particularity in the appended claims. A more thorough understanding of the above and further objects and advantages of this invention may be had by referring to the following detailed description taken in conjunction with the accompanying drawings wherein:

FIGURE 1 schematically illustrates a directional gyroscope which uses this invention in one form;

FIGURE 2 illustrates the application of the present invention to a vertical gyroscope;

FIGURE 3 presents a graphical analysis of the relationship between the spin axis error and the gimbal closure rate;

FIGURE 4 graphically depicts the stop angle required for a zero spin axis error as a function of the gimbal closure rate;

FIGURE 5 illustrates an embodiment of this invention using a rate gyroscope and an adjustable stop;

FIGURE 6 presents another embodiment of this invention wherein an electrical rate signal generator is used in conjunction with a fixed stop;

FIGURE 8 depicts yet another embodiment wherein an accelerometer is combined with a torquer and fixed stop;

FIGURE 9 illustrates another embodiment of a rate sensor particularly adapted for use with a gyroscopic system including a repeater;

FIGURE 10 illustrates still another embodiment of this invention using a pneumatic adjustable stop;

FIGURE 11 shows in detail one embodiment of an adjustable stop as could be used in the system shown in FIGURE 5;

FIGURE 12 presents still another embodiment of an adjustable stop means; and

FIGURE 13 illustrates one embodiment of this invention utilizing a fixed stop and torquer.

Figure 1:
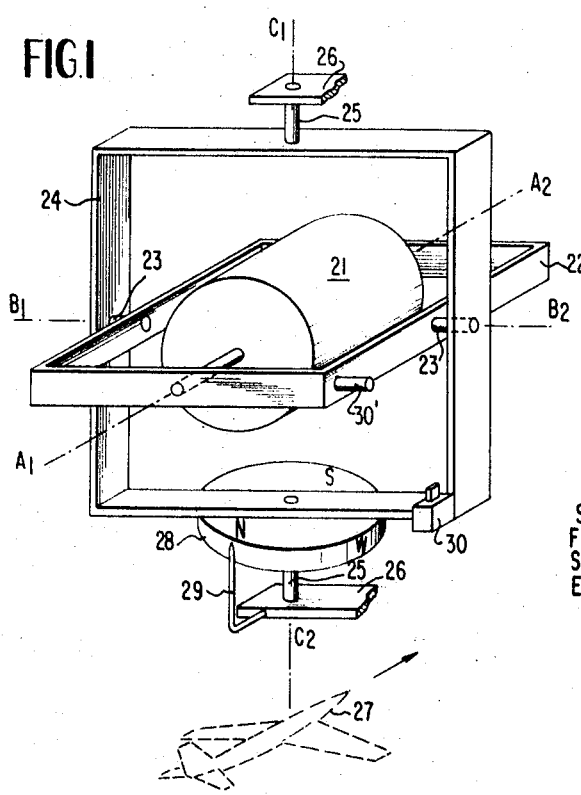

Referring to FIGURE 1, there is shown in schematic form a directional gyro azimuth indicating instrument comprising a rotor 21 which is mounted in an inner gimbal 22 for rotation about a horizontally oriented spin axis $A_1$–$A_2$. The rotor 21 is driven by any suitable electric or pneumatic motor means, the showing of which has been omitted for the sake of clarity. The inner gimbal 22 is supported by trunnions 23 rotatably journaled in an outer gimbal 24 so that the inner gimbal 22 is free to pivot or rotate about a minor gimbal axis $B_1$–$B_2$ extending at right angles to the gyro spin axis $A_1$–$A_2$. The outer gimbal 24 is supported by trunnions 25 mounted in relatively fixed supports 26 so that the outer gimbal 24 is free to rotate about a normally vertical major gimbal axis $C_1$–$C_2$ extending at right angles to the trunnion axis $B_1$–$B_2$. The fixed supports 26 are attached to or form a part of the case of the instrument so they move with the vehicle, shown in phantom as an aircraft 27, on which the instrument is mounted. It should be understood that the fixed supports 26 are mounted to such a vehicle so that it is oriented relative to the instrument as illustrated.

Attached to the outer gimbal 24 is a conventional compass card 28 which is suitably marked with cardinal headings which are read against the stationary index or lubber line 29 mounted on one of the fixed supports 26. The gimbal supporting arrangement for the gryoscope is such that the gyro axes $A_1$–$A_2$, $B_1$–$B_2$, and $C_1$–$C_2$ all intersect at the center of gravity of the gyroscope. This is a conventional Cardan suspension giving three degrees of freedom of gyroscope movement relative to the fixed supports 26. Due to the characteristic gyroscope property of rigidity, the spin axis of the gyroscope tends to stay horizontal, and the outer gimbal 24 and the compass card 28 are stabilized with reference to the rotative movements of the fixed supports 26 in a horizontal plane. Therefore, the azimuth heading of the aircraft 27 is indicated by reading the headings on the compass card 28 against the lubber line 29. One embodiment of an adjustable stop means is shown schematically in FIGURE 1 and designated by the numerals 30 and 30′. It is shown as being mounted on the outer gimbal 24 to prevent the gyroscope from obtaining the gimbal lock position.

Figure 2:
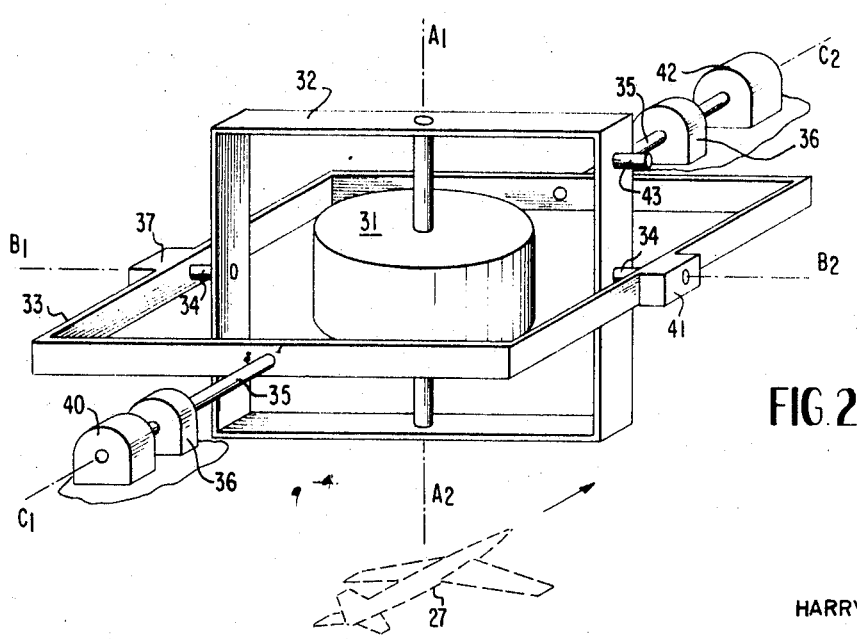

FIGURE 2 illustrates a vertical gyroscope arrangement compensated by another embodiment of this invention. Such a gyroscope indicates or controls pitch and bank attitudes of a vehicle in flight. A rotor 31 is supported on an inner gimbal 32 for rotation about a vertically oriented spin axis $A_1$–$A_2$. The inner gimbal 32 is rotatably mounted on an outer gimbal 33 by means of trunnions 34 to permit rotation of the rotor 31 about a minor gimbal axis $B_1$–$B_2$. The outer gimbal 33 has trunnions 35 rotatably mounted on fixed supports 36 to permit rotation of the outer gimbal 33 and the rotor 31 about the major gimbal axis $C_1$–$C_2$.

It will be understood that for use on vehicles to indicate or control pitch and blank attitudes, the fixed supports 36 may be mounted on the vehicle so that the major gimbal axis $C_1$–$C_2$ extends fore and aft in the direction of the roll or bank axis and so the minor gimbal axis $B_1$–$B_2$ extends perpendicularly thereto in a direction of the pitch axis. In this configuration the gyroscope tends to maintain the orientation of its spin axis $A_1$–$A_2$ in the vertical direction. Pitch movements are indicated by rotation of the trunnions 34 relative to the outer gimbal 33; and roll movements, by rotation of the trunnions 35 relative to the fixed supports 36. These pitch and roll movements can be measured by pitch and roll electrical pickoff devices 37 and 40, respectively, of known construction. Torquers 41 and 42 may also be used to apply precessional torques to the gyroscope about the axes $B_1$–$B_2$ and $C_1$–$C_2$.

This type of universally mounted gyroscope then indicates pitch and roll through instrumentation, not shown for purposes of clarity, connected to the pickoffs 37 and 40. One embodiment of this invention particularly adapted to gyroscopes using torquers is to apply the precessional torque about the major axis $C_1$–$C_2$ by using the torquer 42 in combination with a fixed stop member 43.

Figure 3:
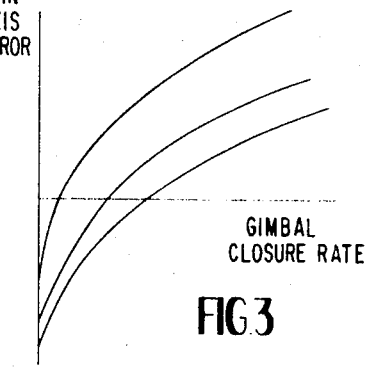
Figure 4:
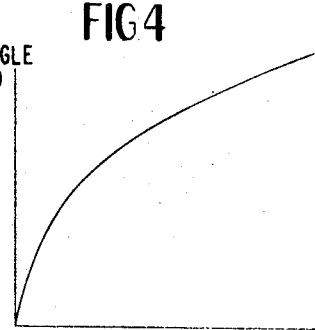

Before proceeding with a detailed discussion of the various means which may be utilized to provide a stop angle which results in the application of a resultant torque to the gyroscope so that a 180° movement of the outer gimbal is caused near the gimbal lock position without a resultant displacement of the spin axis, a better understanding of this invention will be had by first referring to some empirical data which defines some mathematical equations. FIGURE 3 illustrates empirical data showing the relationship of the spin axis error introduced by a fixed stop as a function of the gimbal closure rate for different stop angles in a given gyroscope. From this analysis it can be seen that a fixed stop produces a zero spin axis orientation error only at a particular gimbal closure rate and that for all other rates a positive or negative error is introduced. FIGURE 4, however, illustrates a stop angle required for a zero spin axis orientation error as a function of gimbal closure rate in a range normally encountered in vehicles utilizing such gyroscopically controlled instruments. This graph shows that the stop angle required for zero error varies approximately as the cube root of the gimbal closure rate, and the following equation has been found to define the relationship between gimbal closure rate and the stop angle required for a zero error.

(1) $$\alpha = K \sqrt[3]{\omega}$$

$\alpha$ is the stop angle required for zero error; $K$, a proportionality constant for a given gyroscope; and $\omega$, the gimbal closure rate. In accordance with this invention, correction is made by one of two alternative systems so that a zero spin axis orientation results. In both embodiments the gimbal closure rate is determined so that the predictable results of that gimbal closure rate can be readily ascertained. In one embodiment the gimbal closure rate is fed into an adjustable stop means which determines and fixes the stop angle in accordance with the graph for FIGURE 4. In the other embodiment, the gimbal closure rate is fed into means for calculating the spin axis error for that gimbal closure rate and for energizing torquers so that the spin axis is processed to nullify that error. This would mean that the outer gimbal 24 shown in FIGURE 1 or the outer gimbal 33 in FIGURE 2 would be rotated so that no error in the output reading caused by improper orientation of the gyroscope spin axis would be encountered.

It has been found that a given gyroscope using a fixed stop completes its end-for-end outer gimbal movement in a period of time which is inversely proportional to the gimbal closure rate and which is defined as:

(2) $$T = K' \sqrt{\frac{I_M}{H \omega \beta}}$$

$T$ is the time required for the outer gimbal to swing 180°; $K'$, a proportionality constant for a given gyroscopic device; $I_M$, the moment of inertia of the gyroscope about the major axis when the fixed stop is engaged; $H$, the angular momentum of the gyroscope about the spin axis; $\omega$, the gimbal closure rate; and $\beta$, the fixed stop angle. As $K$, $I_M$, $H$, and $\beta$ are all constants, it can be seen that the time for the outer gimbal to swing 180° is a function of the gimbal closure rate. Since the error is a repeatable function of the gimbal closure rate, the gimbal closure rate may then be used to correct either the gyroscopic device or any servo mechanism or readout device connected thereto by applying a torque about the major axis to cause a change in spin axis orientation. This gyroscope characteristic can then be used to provide a means for measuring gimbal closure rate in addition to directly measuring the relative velocities between the inner and outer gimbals.

Therefore, these two equations provide a basis for establishing a resultant torque which can be applied to a gyroscopic device to prevent spin axis errors from being introduced into the gyroscope readings as a result of the end-for-end movement of the gyroscope. In one, the stop angle is set so that the spin axis does not change orientation as a result of the outer gimbal rotation; in the other, the momentum induced by engagement of a fixed stop is corrected by the application of a corrective torque about the major gimbal axis. In either case, the resultant torque applied to the gyroscope is that which is required to cause the 180° outer gimbal movement without spin axis error.

FIGURES 5 through 13 illustrate various sensors for measuring the gimbal closure rate, means for adjusting the stop means, and means for applying torques. As will become more obvious during the following description of each figure wherein various systems are illustrated, the figures are merely exemplary. Any given sensor can be used with either an adjustable stop or with the combination of a fixed stop and torquer. Furthermore, the various combinations have been shown only as applied to vertical gyroscopes. However, this is done solely for the purposes of clarity, and it will become obvious that each system can be interchanged between directional and vertical gyroscopes with equal facility.

To present the various aspects of this invention most clearly, examples of means for sensing gimbal closure rate are discussed in detail, and this discussion is followed by detailed analyses of some exemplary adjustable stop means and torque-applying means. Like numbers are used to designate like elements including the numerical designations used in conjunction with the vertical gyroscope illustrated in FIGURE 2.

GIMBAL CLOSURE RATE SENSORS

Figure 5:
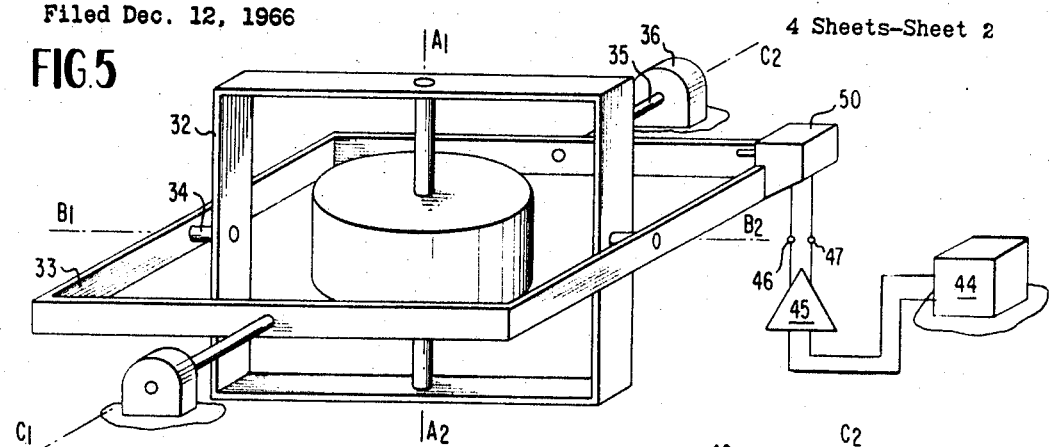

Referring first to FIGURE 5, the gimbal closure rate is shown as being measured by a rate gyro 44. Such devices, well known in the art, are usually positioned in the vehicle at a remote location. If such a rate gyro is properly oriented, it produces an output signal proportional to the rate at which the gyroscope spin and major axes $A_1$–$A_2$ and $C_1$–$C_2$ come into alignment. Such a signal, which is normally of an insufficient magnitude, can then be coupled through an amplifier 45 to appear as a control signal at terminals 46 and 47 and can be coupled to an adjustable stop means 50 shown as being mounted on the outer gimbal 33 to cause interference with the inner gimbal 32 at the angle $\alpha$.

Figure 6:
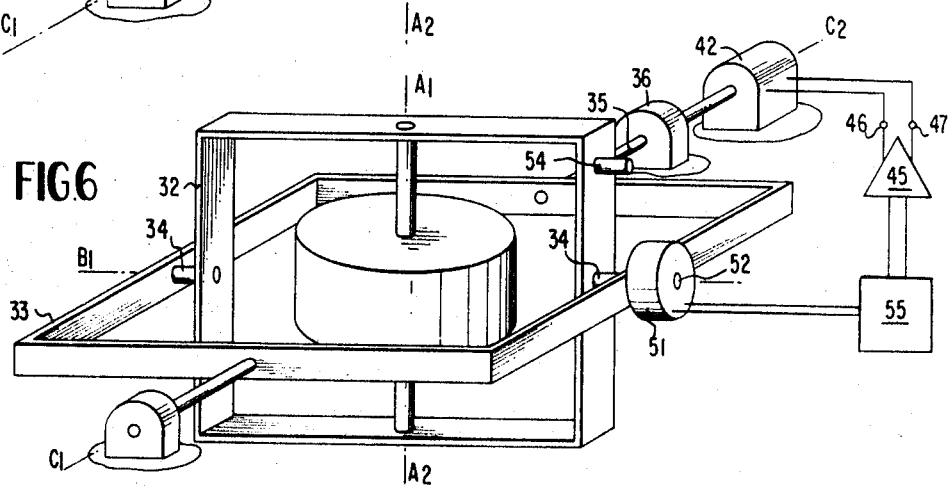

A somewhat similar control signal is produced at the terminals 46 and 47 by a rate signal generator system as shown in FIGURE 6. Such a system could comprise an electrical generator 51 having its stator mounted on the outer gimbal 33 while its rotor would be coupled by shaft 52 to one of the trunnions 34 which rotates with the inner gimbal 32. Therefore, the speed of the shaft 52, which would normally be increased over the speed of the trunnion 34 by some gearing means, would indicate the gimbal closure rate. If such a generator were energized at a constant level, the output voltage would be proportional to the generator speed. An amplifier 45 would then be used to increase the generator voltage to a level sufficient to operate an adjustable stop means or, as shown in FIGURE 6, a torquing means 42 used in conjunction with a fixed stop pin 54, this approach requiring the addition of a function generator 55 which is shown as providing an output voltage to energize the torquing means 42 at a proper level after the output from the function generator 55 is amplified.

Figure 7:
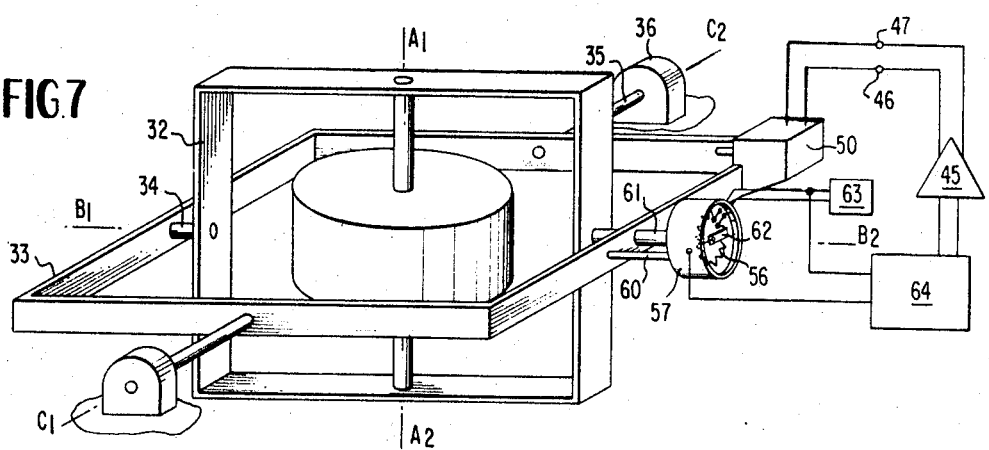
FIGURE 7 shows still another gimbal closure rate sensor combined with a torquing means and an adjustable stop.

FIGURE 7 presents a schematic diagram for a system which can be mounted entirely on the outer gimbal 33 when the gimbal closure rate is obtained from an electrical pickoff which could be previously mounted on the outer gimbal 33. Such a pickoff is illustrated as comprising a slidewire device including a slidewire 56 fixedly mounted on a housing 57 which in turn is fixedly mounted on the outer gimbal 33 by supports 60. The shaft 61 couples a slider 62 to the trunnion 34 so that the slider 62 rotates relative to the slidewire 56 at the same angular velocity as the gimbal closure rate. If the ends of the slidewire are then connected to a power supply 63, the signal produced between one of the power supply conductors and the slider 62 varies as the relative position of the gimbals 32 and 33 changes. Therefore, if this signal is applied to a differentiating circuit 64 and the output thereof fed to an amplifier 45, a control signal can be obtained at the terminals 46 and 47 which is shown in this system as being applied to an adjustable stop means 50 to vary its position.

Yet another system is shown in FIGURE 8 wherein an accelerometer 65 is mounted on the outer gimbal 33. This device is then coupled to the trunnion 34 to measure the acceleration of the inner gimbal 32 with respect to the outer gimbal 33. As is known in the art, such an accelerometer produces an output signal which can then be integrated once to indicate the velocity between the gimbals 32 and 33, or the gimbal closure rate. Therefore, the output signal from the accelerometer 65 is coupled to an integrating circuit 66, and the output of this circuit is then coupled to a function generator 55 to produce an output signal which is amplified by the amplifier 45 to thereby produce the control signal at the terminals 46 and 47. In this particular system, the control signal is applied to a pneumatic controller 67 which converts the control signals from an electrical to a pneumatic signal, the pneumatic control signal being transferred to a pneumatic torquer 70 which applies the torque around the major axis $C_1$–$C_2$.

FIGURE 9 illustrates a rate sensor which provides an output indicative of the gyro closure rate by measuring the time period for the outer gimbal 33 to traverse 180° after the stop pin 54 mounted on the inner gimbal 32 strikes the outer gimbal 33 causing the 180° rotation of the outer gimbal 33. Although the most accurate results would be obtained from measuring the complete 180° swing of the outer gimbal 33, such a complete swing may not always occur even though the end-for-end movement of the outer gimbal 33 is caused by engagement of the stop pin 54. Therefore, the means for sensing the time period for the end-for-end maneuver are displaced slightly about the circular path scribed by the outer gimbal during rotation. As shown in FIGURE 9, a pair of switches 71 and 72 are displaced slightly from being 180° apart. However, the error introduced by this slight deviation can be compensated readily by adjusting the signal to take into account the shortened time seen by the switching devices. In this particular embodiment the switches 71 and 72 are connected in series so that they control a counting circuit 73 which produces an output signal in accordance with the equation for the time period T. The counting circuit 73 produces an output signal which is then fed to an optional delay circuit 74 to prevent passage of the signal from the counter 73 for a predetermined period of time so as to assure that the gimbal has completed its swing before applying the output signal from the counting circuit 73. From the delay circuit, the signal is coupled through the function generator 55 and the amplifier 45 to appear as the control signal at the terminals 46 and 47 for energizing the torquing means 42. This type of counting device is particularly adapted to use in a gyroscope system which utilizes a main gyroscope and a repeater as the switches 71 and 72 can be mounted on the repeater. The controlling torque can then either be applied directly to the main gyroscope as shown in FIGURE 9 or can be applied to the repeating element to provide the correction in the readings.

ADJUSTABLE STOP MEANS

FIGURES 10, 11, and 12 illustrate various examples of adjustable stop means; the stop means in FIGURES 11 and 12 can be utilized with any of the rate sensing circuits illustrated in FIGURES 5 through 9. Referring specifically to FIGURE 10, therein is shown a partial view of a gyroscope including a rotor 31, the inner gimbal 32, the outer gimbal 33, and the trunnion 34 interconnecting the inner and outer gimbals. In this FIGURE the gyroscope is shown as it would appear in a looping maneuver wherein the major axis $C_1$–$C_2$ is approaching alignment with the spin axis $A_1$–$A_2$, the spin axis $A_1$–$A_2$ remaining stationary in space while the fixed support 36 and its supporting trunnion 35 are moved. Mounted on the outer gimbal 33 is a dashpot 75 which includes a piston 76 having an extension 77 which is positioned to interfere with a protuberance 80 on the inner gimbal 32. Such a dashpot will exhibit the characteristic of displacing a relatively small amount if a high-velocity force is applied to the piston and displacing a relatively large amount if only a low-velocity force is applied to the piston if a non-Newtonian fluid is used. Therefore, by forming the dashpot 75 in the proper manner, the displacement of the piston 76 can be controlled so that upon being struck by the proturbance 80 on the inner gimbal 32 as the gimbal lock position is approached, the piston will be displaced toward the bottom of the dashpot 75 in accordance with the graph shown in FIGURE 4 so that the correct angle for zero spin axis error is obtained. This type of device is particularly adapted to relatively low momentum gyroscopes because it is extremely compact and does not require separate rate sensors and adjustable stop means as the dashpot performs both functions. The leakage in the dashpot constitutes the means for sensing the gimbal closure rate and converting that rate to a position of the dashpot piston which performs the function of the adjustable stop means.

FIGURE 11 presents an electrically operated adjustable stop means constituted by a solenoid 81 having a coil 82 connected to terminals 46 and 47 to be energized by the control signal from any of the rate sensors discussed above. A solenoid plunger 83 is biased by a spring 84 so that its displacement produces stop angles in accordance with the graph shown in FIGURE 4. The solenoid 81 is again shown as being mounted on the outer gimbal 33 so that the plunger 83 will be energized and moved outwardly from the solenoid to interfere with the protuberance 80 on the inner gimbal 32.

Still another adjustable stop means is shown in FIGURE 12 as being constituted by a restrained motor including an electrically operated motor 85 adapted for connection to terminals 46 and 47. An external rotable member 86 is mounted on the shaft of the motor 85 and has a pin 87 mounted thereto. The pin is mounted so that when a spring 90 is at a zero force position, the pin 87 is positioned to provide a zero stop angle. The spring characteristics and control signal values are then correlated so that in conjunction with the motor characteristics the stop pin 87 is displaced when the motor 85 is energized by an amount which will cause engagement of the protuberance 80 on the inner gimbal 32 with the pin 87 mounted by the motor 85 on the outer gimbal 33 at the correct stop angle for zero spin axis error.

It will be obvious to those of ordinary skill in the art that these and other adjustable stop means can be utilized with any means for sensing the gimbal closure rate to position a stop on one of the gyroscope gimbals for interference with the other gimbal at an angle which will produce zero spin axis error when the vehicle carrying the gyroscope is maneuvered to bring the spin and major axes of the gyroscope into alignment. The particular or exact structure of such an adjustable stop will depend upon the type of gyroscope to which it is adapted and the application for that gyroscope. In addition, although only electrical stops have been shown in FIGURES 11 and 12, pneumatically operated stops are easily adapted to this invention especially if a rate sensing network is utilized which produces a pneumatic pressure, an example of such a system being shown in FIGURE 8.

TORQUE APPLICATION MEANS

FIGURES 6, 8, and 9 have all illustrated the concept of applying a torque about the major axis of the gyroscope after a fixed stop has engaged to cause a precessional torque to be applied about the major axis for changing the orientation of the spin axis $A_1$–$A_2$. As a fixed stop pin 54 is utilized in these systems, one of the graphs shown in FIGURE 3 is brought into play. Therefore, at only one gimbal closure rate will a zero spin axis error result. However, as the error is predictable and calculable if the gimbal closure rate is known, any of the sensors shown in the figures will provide the gimbal closure rate. With this information and with a knowledge of the other characteristics of the particular gyroscope to which the gimbal stop system is to be applied, it is possible to program a function generator to produdce a torque of a magnitude, direction and duration to nullify the spin axis orientation error. Such function generators are well known in the art, and the particular circuitry involved with any specific function generator would be dependent upon the gyroscope and its application. One consideration to be analyzed is the position at which the torque is applied as the torque required near the stop angle is less than that required when the axes approach a position being mutually perpendicular to accomplish the same spin axis displacement. However, near the stop angle the gyroscope is more sensitive to torques so that accurate torquing means must be utilized.

FIGURE 13 illustrates one such embodiment of a fixed stop torquer means utilizing these concepts. For discussing the details of this scheme, several valid assumptions must be made. First, over the range of normally encountered spin axis errors the torque required to reorient the spin axis is linearly proportional to the error angle. Secondly, the torque applied about the major axis varies linearly with the signal applied to the torquer. Finally, the magnitude and duration of the torque about the major axis required to precess the spin axis a given angle varies sinusoidally from the gimbal lock position to the orthogonal erection of the gyroscope wherein the axes are mutually perpendicular.

Now referring to Equation 2 and the equation for the spin axis error, $\eta$, when a fixed stop is used:

(3) $\qquad \eta = \omega T - 2\beta$

Equation 3 becomes (4) $\qquad \eta = \dfrac{(K')^2 I_M}{H\beta} \cdot \dfrac{1}{T} - 2\beta$ By definition, T is inversely proportional to the outer gimbal velocity, $\omega_g$, during the 180° turn, so (5) $\qquad \eta = K''\omega_g - K'''$ Where (5) $\qquad K'' = \dfrac{(K')^2 I_M}{H\beta}$ and $\qquad K''' = 2\beta$ If a voltage is produced so that $\qquad V = k'\omega_g$ then (6) $\qquad \eta = kV - K'''$ Therefore, if a voltage, generated to vary linearly as the average speed of the outer gimbal, is added to a fixed voltage proportional to twice the fixed stop angle, the resulting control voltage varies linearly as the spin axis error. If such a control voltage is then applied to a system embodying the assumptions presented above, the control signal linearly precesses the spin axis to its original position.

When the gyroscope of FIGURE 13 approaches the gimbal lock position, the stop pin 54 engages the outer gimbal 33 and a switching means 91 simultaneously. The outer gimbal 33 then rotates 180°, and a sensor 92 measures the velocity and produces an output signal which is coupled to an adding circuit 93. A constant signal generator 94 feeds the other voltage to be added which is proportional to twice the stop angle, and the two signals are added algebraically. The resulting control signal is coupled through an attenuation and gate circuit 95 and the amplifier 45 to be applied by means of the terminals 46 and 47 to the torquer 42. Attenuation provides scaling in accordance with the major axis-spin axis angle when the torque is applied and would usually be a fixed value. However, instantaneous readings of the axis alignment could be used to provide exact torques. Gating is controlled by the switch 91 so torques are applied only if the stop pin 54 has engaged the outer gimbal 33.

SUMMARY

Each of the high-angle gimbal stop systems illustrated in FIGURES 5 through 12 presents different means for preventing the gimbal lock condition from being obtained in a gyroscope in such a manner that no spin axis error results. Basically, each system works on the principle that a spin axis error is a repeatable function of the gimbal closure rate for a particular gyroscope. Therefore, as the error is a known quantity, it can be compensated either by moving the gimbal stop to a position where a zero error for the particular gimbal closure rate results or by utilizing a fixed stop and applying a corrective torque after engagement of the fixed stop to correct the known spin axis error.

Each of the illustrated systems produces the resultant function of causing an end-for-end movement of the outer gimbal about the major axis of the gyroscope without causing any resultant error in the spin axis orientation. It should now be clear that any of the rate sensors shown can be used with any of the adjustable stop means illustrated in FIGURES 5, 7, 11, and 12 or any of the fixed stop-torquer systems illustrated in FIGURES 6, 8 and 9. Although the positions of the various rate sensors, torquers, and stops have been chosen to clearly illustrate the invention, it should also now be apparent that these elements can be mounted on any part of the gyroscope or, if a repeater system is used, on the repeater with the same results. Therefore, it is the intention in the appended claims to cover all such embodiments which fall within the true spirit and scope of this invention.

What is claimed as new and desired to be secured by Letters Patent of the United States is:

1. In a gyroscopic device including a gyroscope having an inner gimbal, a rotor constituted by a rotatable mass mounted on the inner gimbal for rotation about a spin axis and means for rotating said mass, an outer gimbal, means mounting the inner gimbal on the outer gimbal for rotation about a minor axis perpendicular to the spin axis, a maneuverable support means, means mounting the outer gimbal on said support means for rotation about a major axis perpendicular to the minor axis, the support being maneuverable to tend to cause gimbal lock wherein the spin and major axes are in alignment, the improvement comprising means for preventing the condition of gimbal lock actuated within a few degrees of the gimbal lock position including:
    (a) means sensing the rate at which the gimbal lock position is approached, and
    (b) means including stop means engaging within a few degrees of the gimbal lock position to prevent movement of the gimbals to the gimbal lock position coupled to said rate-sensing means and responsive thereto to apply a resultant precessional torque to the gyroscopic device to cause the outer gimbal to rotate approximately 180° and to restore the spin axis to its position prior to the maneuver of said support means.

2. A gyroscopic device as recited in claim 1 wherein said resultant precessional torque application means includes an adjustable stop means mounted on one of said gimbals and means on the other of said gimbals for engaging said stop means at an angle a few degrees before the gimbal lock position is reached, the angle being determined by the position of said adjustable stop means which moves in response to said rate-sensing means.

3. A gyroscopic device as recited in claim 2 wherein said adjustable stop means is positioned to cause gimbal engagement at an angle defined as:

$$\alpha = K^3 \sqrt{\omega}$$

wherein $\alpha$ is the angle for engagement, K is a constant, and $\omega$ is the rate at which said gimbals approach said gimbal lock position.

4. A gyroscopic device as recited in claim 2 wherein said rate sensor is constituted by means for producing an electrical output signal indicating the relative angular velocity of said gimbals as they approach the gimbal lock position and wherein said adjustable stop member includes electromotive means energized by said output signal to position said stop means in response to said output signal from said rate sensor.

5. A gyroscopic device as recited in claim 2 wherein said rate sensor is constituted by a means mounted on said gyroscopic device for producing a pneumatic signal proportional to the relative angular velocity at which said gimbals approach the gimbal lock position and wherein said adjustable stop means includes positioning means responsive to the pressure signal generated by said rate sensor to position said adjustable stop means for minimum error.

6. A gyroscopic device as recited in claim 1 wherein said resultant precessional torque-applying means is constituted by a fixed stop means between the gimbals for preventing movement, which would otherwise be permitted, of the gimbals to the gimbal lock position, said stop means becoming effective within a few degrees of said gimbal lock position to cause the outer gimbal to rotate approximately 180° and means responsive to said rate sensing means for providing a torque about the major axis of a magnitude to correct for spin axis error.

7. A gyroscopic device as recited in claim 6 wherein said rate sensing means measures the time period for the outer gimbal to turn about its axis after said fixed stop means engages, said time period indicating the rate at which said gimbals approach said gimbal lock position, said time period being defined as $$T = K \sqrt{\frac{I_M}{H\omega\beta}}$$

wherein $\beta$ is the fixed stop angle, $\omega$ is the rate at which said gimbals approach said gimbal lock position, H is the angular momentum about the spin axis, $I_M$ is the moment of inertia of said gyroscope about the major axis with the fixed stop engaged, and K is a constant.

8. A gyroscopic device as recited in claim 6 wherein said rate sensor is constituted by means measuring the velocity of the outer gimbal as it turns about its axis after said fixed stop is engaged, said velocity-measuring means producing a first signal, means producing a second signal equal to the first signal at zero velocity and means adding said first and second signals, said adding means producing a control signal which varies linearly as the spin axis orientation error, said torquing means being responsive to said control signal.

9. A gyroscopic device as recited in claim 6 wherein said rate sensing means produces an electrical signal and said torquing means is constituted by an electrically actuated torque motor applying a torque about the major axis of a value and a direction which, when combined with the precessional torque applied by the engagement of said fixed stop means, provides a resultant torque to cause the spin axis to return to its original position.

10. A gyroscopic device as recited in claim 6 wherein said rate sensor produces a pneumatic pressure signal and said torquing means is constituted by a pneumatically operated torque motor for applying a torque about the major axis to provide a resultant torque to cause the spin axis to return to its original position.

References Cited

UNITED STATES PATENTS

| | | | |
|---|---|---|---|
| 2,493,015 | 1/1950 | Newton | 74—5.2 |
| 3,079,803 | 3/1963 | Moller | 74—5.5 |
| 3,188,870 | 6/1965 | Lerman | 74—5.2 |

ROBERT A. O'LEARY, Primary Examiner

W. E. WAYNER, Assistant Examiner

U.S. Cl. X.R.

74—5.6